June 21, 1966 — H. FLEISHER ETAL — 3,257,548
DIVISION TECHNIQUES
Filed Dec. 13, 1961 — 16 Sheets-Sheet 3

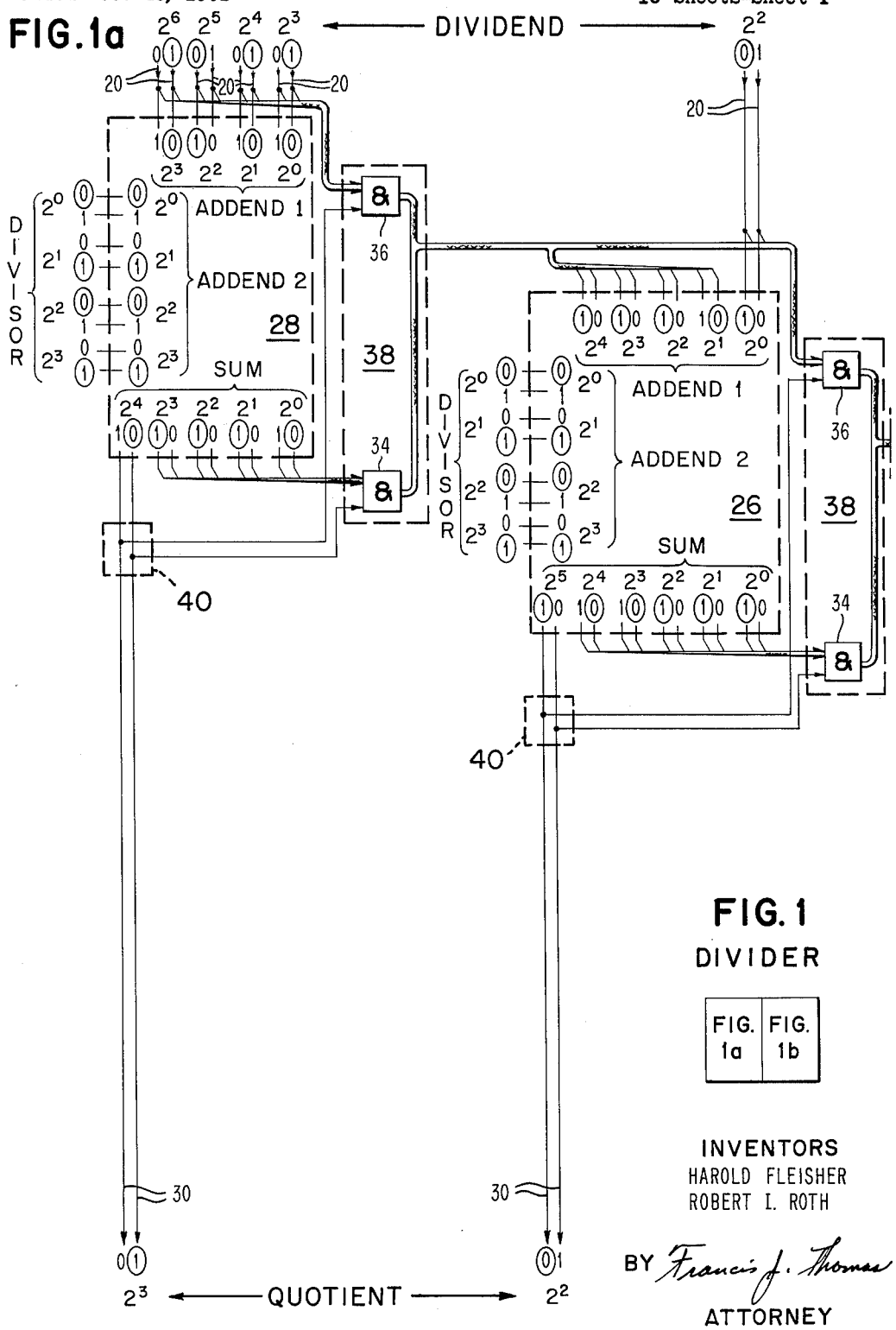

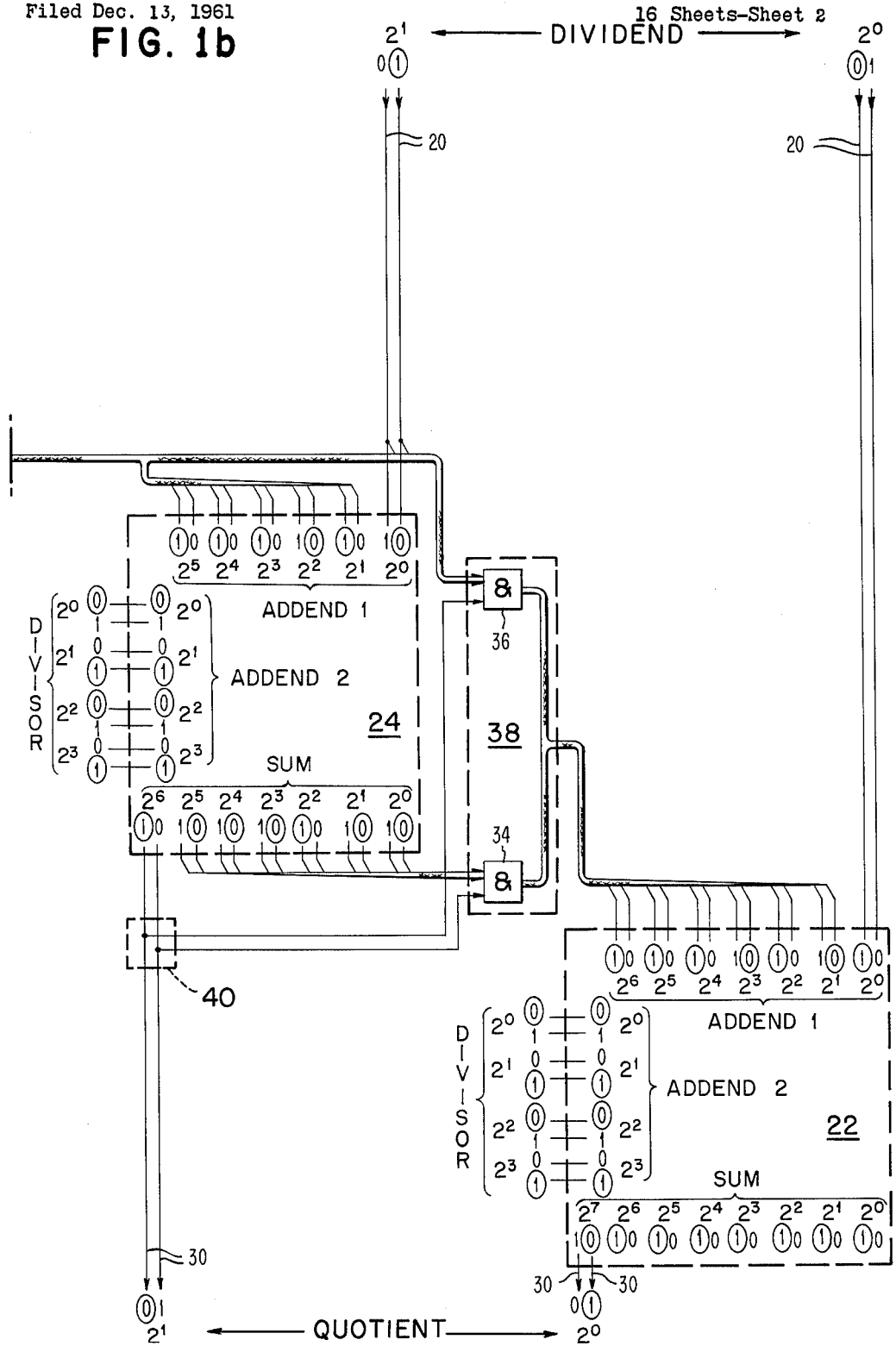

ADDER
CRYOGENIC EMBODIMENT

| | | | | | | | | | | | | | | | | | | | | | |
|---|---|---|---|---|---|---|---|---|---|---|---|---|---|---|---|---|---|---|---|---|---|
| ADDEND | | | GROUP 56 | | | | GROUP 58 | | | GROUP 60 | | | GROUP 62 | | | | | | GROUP 64 | | |
| 1 | 2 | | -1 | -2 | -3 | -4 | -1 | -2 | -3 | -1 | -2 | -3 | -1 | -2 | -3 | -4 | -5 | -6 | -1 | -2 | -3 | -4 |
| 0000 | 000 | | × | ✓ | × | | ✓ | | × | × | ✓ | × | ✓ | | | × | × | × | | ✓ | ✓ | | × |
| | 001 | | ✓ | × | | × | ✓ | × | | × | ✓ | × | ✓ | | | × | × | × | | ✓ | ✓ | | × |
| | 010 | | × | ✓ | × | | ✓ | | × | ✓ | × | | × | | ✓ | × | × | × | | ✓ | ✓ | × | |
| | 011 | | ✓ | × | | × | ✓ | × | | ✓ | × | | × | | ✓ | × | × | × | | ✓ | ✓ | × | |
| | 100 | | × | ✓ | × | | ✓ | | × | × | ✓ | × | ✓ | | | × | × | × | | ✓ | ✓ | | × |
| | 101 | | ✓ | × | | × | ✓ | × | | × | ✓ | × | ✓ | | | × | × | × | | ✓ | ✓ | | × |
| | 110 | | × | ✓ | × | | ✓ | | × | ✓ | × | | × | | ✓ | × | × | × | | ✓ | ✓ | × | |
| | 111 | | ✓ | × | | × | ✓ | × | | ✓ | × | | × | | ✓ | × | × | × | | ✓ | ✓ | × | |
| 0001 | 000 | | × | | × | ✓ | ✓ | × | | × | ✓ | × | | ✓ | | × | × | × | | ✓ | ✓ | | × |
| | 001 | | | × | ✓ | × | × | ✓ | ✓ | × | ✓ | × | | ✓ | | × | × | × | ✓ | | ✓ | ✓ | × |
| | 010 | | × | | × | ✓ | ✓ | × | | ✓ | × | | | ✓ | | × | × | × | | ✓ | ✓ | × | |
| | 011 | | | × | ✓ | × | × | ✓ | ✓ | ✓ | × | | × | × | × | | ✓ | | | × | ✓ | ✓ | |
| | 100 | | × | | × | ✓ | ✓ | × | | × | ✓ | × | | ✓ | | × | × | × | | ✓ | ✓ | | × |
| | 101 | | | × | ✓ | × | × | ✓ | ✓ | × | ✓ | × | | × | × | × | ✓ | | | ✓ | ✓ | × | |
| | 110 | | × | | × | ✓ | ✓ | × | | ✓ | × | | | ✓ | | × | × | × | | ✓ | ✓ | × | |
| | 111 | | | × | ✓ | × | × | ✓ | ✓ | ✓ | × | | × | × | × | | ✓ | | | × | ✓ | ✓ | |
| 0010 | 000 | | × | ✓ | × | | ✓ | | × | × | | × | ✓ | ✓ | | | × | × | × | | ✓ | ✓ | × | |
| | 001 | | ✓ | × | | × | ✓ | × | | × | | × | ✓ | ✓ | | | × | × | × | | ✓ | ✓ | × | |
| | 010 | | × | ✓ | × | | ✓ | | × | × | ✓ | × | | | ✓ | × | × | × | | × | ✓ | ✓ | |
| | 011 | | ✓ | × | | × | ✓ | × | | × | ✓ | × | | | ✓ | × | × | × | | × | ✓ | ✓ | |
| | 100 | | × | ✓ | × | | ✓ | | × | × | | × | ✓ | ✓ | | | × | × | × | | ✓ | ✓ | × | |
| | 101 | | ✓ | × | | × | ✓ | × | | × | | × | ✓ | ✓ | | | × | × | × | | ✓ | ✓ | × | |
| | 110 | | × | ✓ | × | | ✓ | | × | × | ✓ | × | | | ✓ | × | × | × | | × | ✓ | ✓ | |
| | 111 | | ✓ | × | | × | ✓ | × | | × | ✓ | × | | | ✓ | × | × | × | | × | ✓ | ✓ | |
| 0011 | 000 | | × | | × | ✓ | ✓ | × | | × | | × | ✓ | ✓ | | × | × | × | | ✓ | ✓ | × | |
| | 001 | | | × | ✓ | × | × | ✓ | ✓ | × | | × | ✓ | × | × | × | | ✓ | | | × | ✓ | ✓ |
| | 010 | | × | | × | ✓ | ✓ | × | | × | ✓ | × | | | ✓ | × | × | × | | × | ✓ | ✓ | |
| | 011 | | | × | ✓ | × | × | ✓ | ✓ | × | ✓ | × | × | × | × | | | ✓ | × | | ✓ | ✓ | |
| | 100 | | × | | × | ✓ | ✓ | × | | × | | × | ✓ | ✓ | | × | × | × | | ✓ | ✓ | × | |
| | 101 | | | × | ✓ | × | × | ✓ | ✓ | × | | × | ✓ | × | × | × | | ✓ | | | × | ✓ | ✓ |
| | 110 | | × | | × | ✓ | ✓ | × | | × | ✓ | × | | | ✓ | × | × | × | | × | ✓ | ✓ | |
| | 111 | | | × | ✓ | × | × | ✓ | ✓ | × | ✓ | × | × | × | × | | | ✓ | × | | ✓ | ✓ | |
| 0100 | 000 | | × | ✓ | × | | ✓ | | × | ✓ | × | | ✓ | | | × | × | × | | ✓ | ✓ | | × |
| | 001 | | ✓ | × | | × | ✓ | × | | × | ✓ | × | ✓ | | | × | × | × | | ✓ | ✓ | | × |
| | 010 | | × | ✓ | × | | ✓ | | × | ✓ | × | | | ✓ | | × | × | × | | ✓ | ✓ | × | |
| | 011 | | ✓ | × | | × | ✓ | × | | ✓ | × | | | ✓ | | × | × | × | | ✓ | ✓ | × | |
| | 100 | | × | ✓ | × | | ✓ | | × | × | ✓ | × | ✓ | | | × | × | × | | ✓ | ✓ | | × |
| | 101 | | ✓ | × | | × | ✓ | × | | × | ✓ | × | ✓ | | | × | × | × | | ✓ | ✓ | | × |
| | 110 | | × | ✓ | × | | ✓ | | × | ✓ | × | | | ✓ | | × | × | × | | ✓ | ✓ | × | |
| | 111 | | ✓ | × | | × | ✓ | × | | ✓ | × | | | ✓ | | × | × | × | | ✓ | ✓ | × | |

| FIG 3a | FIG 3b |
|---|---|
| FIG 3c | FIG 3d |
| FIG 3e | FIG 3f |

FIG.3b

| CRYOTRONS ||||||||||||||||||||||
|---|---|---|---|---|---|---|---|---|---|---|---|---|---|---|---|---|---|---|---|---|---|
| GROUP 66 |||| GROUP 68 |||||| GROUP 70 |||| GROUP 72 |||| GROUP 74 ||| GROUP 76 || SUM |
| -1 | -2 | -3 | -4 | -1 | -2 | -3 | -4 | -5 | -6 | -1 | -2 | -3 | -4 | -1 | -2 | -3 | -4 | -1 | -2 | -3 | -1 | -2 | |
| × | ✓ | × |   | ✓ |   |   | × | × | × | ✓ | ✓ |   | × | × | ✓ | × |   | ✓ |   | × | × | ✓ | 00000 |
| × | ✓ | × |   | ✓ |   |   | × | × | × | ✓ | ✓ |   | × | × | ✓ | × |   | ✓ |   | × | × | ✓ | 00001 |
| × | ✓ | × |   | ✓ |   |   | × | × | × | ✓ | ✓ |   | × | × | ✓ | × |   | ✓ |   | × | × | ✓ | 00010 |
| × | ✓ | × |   | ✓ |   |   | × | × | × | ✓ | ✓ |   | × | × | ✓ | × |   | ✓ |   | × | × | ✓ | 00011 |
| ✓ | × |   | × |   | ✓ |   | × | × | × | ✓ | ✓ | × |   | × | ✓ | × |   | ✓ |   | × | × | ✓ | 00100 |
| ✓ | × |   | × |   | ✓ |   | × | × | × | ✓ | ✓ | × |   | × | ✓ | × |   | ✓ |   | × | × | ✓ | 00101 |
| ✓ | × |   | × |   | ✓ |   | × | × | × | ✓ | ✓ | × |   | × | ✓ | × |   | ✓ |   | × | × | ✓ | 00110 |
| ✓ | × |   | × |   | ✓ |   | × | × | × | ✓ | ✓ | × |   | × | ✓ | × |   | ✓ |   | × | × | ✓ | 00111 |
| × | ✓ | × |   | ✓ |   |   | × | × | × |   |   |   | × | × | ✓ | × |   | ✓ |   | × | × | ✓ | 00001 |
| × | ✓ | × |   | ✓ |   |   | × | × | × | ✓ | ✓ |   | × | × | ✓ | × |   | ✓ |   | × | × | ✓ | 00010 |
| × | ✓ | × |   | ✓ |   |   | × | × | × | ✓ | ✓ |   | × | × | ✓ | × |   | ✓ |   | × | × | ✓ | 00011 |
| × | ✓ | × |   | × | × | × | ✓ |   |   | ✓ | ✓ | × |   | × | ✓ | × |   | ✓ |   | × | × | ✓ | 00100 |
| ✓ | × |   | × |   | ✓ |   | × | × | × | ✓ | ✓ | × |   | × | ✓ | × |   | ✓ |   | × | × | ✓ | 00101 |
| ✓ | × |   | × |   | ✓ |   | × | × | × | ✓ | ✓ | × |   | × | ✓ | × |   | ✓ |   | × | × | ✓ | 00110 |
| ✓ | × |   | × |   | ✓ |   | × | × | × | ✓ | ✓ | × |   | × | ✓ | × |   | ✓ |   | × | × | ✓ | 00111 |
| ✓ | × |   | × | × | × | × |   | ✓ |   |   | × | ✓ | ✓ | ✓ | × |   | × | ✓ | × |   | × | ✓ | 01000 |
| × | ✓ | × |   | ✓ |   |   | × | × | × | ✓ | ✓ |   | × | × | ✓ | × |   | ✓ |   | × | × | ✓ | 00010 |
| × | ✓ | × |   | ✓ |   |   | × | × | × | ✓ | ✓ |   | × | × | ✓ | × |   | ✓ |   | × | × | ✓ | 00011 |
| × | ✓ | × |   | × | × | × | ✓ |   |   | ✓ | ✓ | × |   | × | ✓ | × |   | ✓ |   | × | × | ✓ | 00100 |
| × | ✓ | × |   | × | × | × | ✓ |   |   | ✓ | ✓ | × |   | × | ✓ | × |   | ✓ |   | × | × | ✓ | 00101 |
| ✓ | × |   | × |   | ✓ |   | × | × | × | ✓ | ✓ | × |   | × | ✓ | × |   | ✓ |   | × | × | ✓ | 00110 |
| ✓ | × |   | × |   | ✓ |   | × | × | × | ✓ | ✓ | × |   | × | ✓ | × |   | ✓ |   | × | × | ✓ | 00111 |
| ✓ | × |   | × | × | × | × |   | ✓ |   |   | × | ✓ | ✓ | ✓ | × |   | × | ✓ | × |   | × | ✓ | 01000 |
| ✓ | × |   | × | × | × | × |   | ✓ |   |   | × | ✓ | ✓ | ✓ | × |   | × | ✓ | × |   | × | ✓ | 01001 |
| × | ✓ | × |   | ✓ |   |   | × | × | × | ✓ | ✓ |   | × | × | ✓ | × |   | ✓ |   | × | × | ✓ | 00011 |
| × | ✓ | × |   | × | × | × | ✓ |   |   | ✓ | ✓ | × |   | × | ✓ | × |   | ✓ |   | × | × | ✓ | 00100 |
| × | ✓ | × |   | × | × | × | ✓ |   |   | ✓ | ✓ | × |   | × | ✓ | × |   | ✓ |   | × | × | ✓ | 00101 |
| × | ✓ | × |   | × | × | × | ✓ |   |   | ✓ | ✓ | × |   | × | ✓ | × |   | ✓ |   | × | × | ✓ | 00110 |
| ✓ | × |   | × |   | ✓ |   | × | × | × | ✓ | ✓ | × |   | × | ✓ | × |   | ✓ |   | × | × | ✓ | 00111 |
| ✓ | × |   | × | × | × | × |   | ✓ |   |   | × | ✓ | ✓ | ✓ | × |   | × | ✓ | × |   | × | ✓ | 01000 |
| ✓ | × |   | × | × | × | × |   | ✓ |   |   | × | ✓ | ✓ | ✓ | × |   | × | ✓ | × |   | × | ✓ | 01001 |
| ✓ | × |   | × | × | × | × |   | ✓ |   |   | × | ✓ | ✓ | ✓ | × |   | × | ✓ | × |   | × | ✓ | 01010 |
| × |   | × | ✓ |   | ✓ |   | × | × | × | ✓ | ✓ | × |   | × | ✓ | × |   | ✓ |   | × | × | ✓ | 00100 |
| × |   | × | ✓ |   | ✓ |   | × | × | × | ✓ | ✓ | × |   | × | ✓ | × |   | ✓ |   | × | × | ✓ | 00101 |
| × |   | × | ✓ |   | ✓ |   | × | × | × | ✓ | ✓ | × |   | × | ✓ | × |   | ✓ |   | × | × | ✓ | 00110 |
| × |   | × | ✓ |   | ✓ |   | × | × | × | ✓ | ✓ | × |   | × | ✓ | × |   | ✓ |   | × | × | ✓ | 00111 |
|   | × | ✓ | × |   | ✓ | × | × | × |   | × | ✓ | ✓ | ✓ | ✓ | × |   | × | ✓ | × |   | × | ✓ | 01000 |
|   | × | ✓ | × |   | ✓ | × | × | × |   | × | ✓ | ✓ | ✓ | ✓ | × |   | × | ✓ | × |   | × | ✓ | 01001 |
|   | × | ✓ | × |   | ✓ | × | × | × |   | × | ✓ | ✓ | ✓ | ✓ | × |   | × | ✓ | × |   | × | ✓ | 01010 |
|   | × | ✓ | × |   | ✓ | × | × | × |   | × | ✓ | ✓ | ✓ | ✓ | × |   | × | ✓ | × |   | × | ✓ | 01011 |

SELECTOR
CRYOGENIC EMBODIMENT

DISTRIBUTOR
CRYOGENIC EMBODIMENT

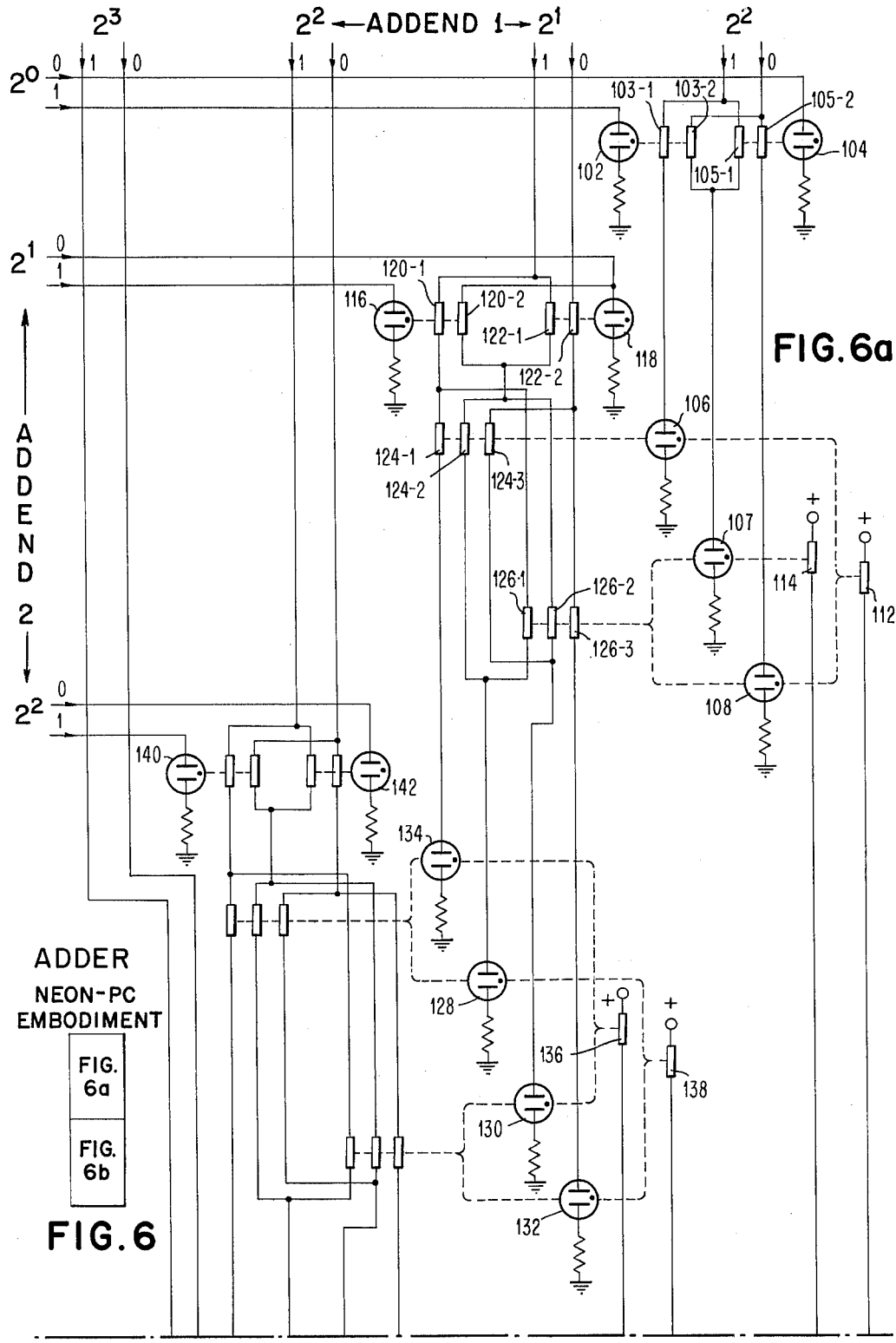

| ADDEND | | NEON LAMPS | | | | | | | | | | | | | | | | | | SUM |
|---|---|---|---|---|---|---|---|---|---|---|---|---|---|---|---|---|---|---|---|---|
| | | 102 | 104 | 106 | 107 | 108 | 116 | 118 | 128 | 130 | 132 | 134 | 140 | 142 | 144 | 146 | 148 | 150 | 152 | 154 | 156 | |
| 0000 | 000 | | ✓ | | | ✓ | | ✓ | | | ✓ | | | ✓ | | | | ✓ | | | ✓ | 00000 |
| | 001 | ✓ | | | ✓ | | | ✓ | | | ✓ | | | ✓ | | | | ✓ | | | ✓ | 00001 |
| | 010 | | ✓ | | | ✓ | ✓ | | | ✓ | | | | ✓ | | | | ✓ | | | ✓ | 00010 |
| | 011 | ✓ | | | ✓ | | ✓ | | | ✓ | | | | ✓ | | | | ✓ | | | ✓ | 00011 |
| | 100 | | ✓ | | | ✓ | | ✓ | | ✓ | ✓ | | | | | ✓ | | | | | ✓ | 00100 |
| | 101 | ✓ | | | ✓ | | | ✓ | | ✓ | ✓ | | | | | ✓ | | | | | ✓ | 00101 |
| | 110 | | ✓ | | | ✓ | ✓ | | | ✓ | | ✓ | | | | ✓ | | | | | ✓ | 00110 |
| | 111 | ✓ | | | ✓ | | ✓ | | | ✓ | | ✓ | | | | ✓ | | | | | ✓ | 00111 |
| 0001 | 000 | | ✓ | | ✓ | | | ✓ | | ✓ | | | | ✓ | | | | ✓ | | | ✓ | 00001 |
| | 001 | ✓ | | ✓ | | | | ✓ | ✓ | | | | | ✓ | | | | ✓ | | | ✓ | 00010 |
| | 010 | | ✓ | | ✓ | | ✓ | | | ✓ | | | | ✓ | | | | ✓ | | | ✓ | 00011 |
| | 011 | ✓ | | ✓ | | | ✓ | | ✓ | | | | | ✓ | | ✓ | | | | | ✓ | 00100 |
| | 100 | | ✓ | | ✓ | | | ✓ | | ✓ | ✓ | | | | | ✓ | | | | | ✓ | 00101 |
| | 101 | ✓ | | ✓ | | | | ✓ | | ✓ | ✓ | | | | | ✓ | | | | | ✓ | 00110 |
| | 110 | | ✓ | | ✓ | | ✓ | | ✓ | ✓ | | | | | | ✓ | | | | | ✓ | 00111 |
| | 111 | ✓ | | ✓ | | | ✓ | | ✓ | | | | | ✓ | | ✓ | | | | ✓ | | 01000 |
| 0010 | 000 | | ✓ | | | ✓ | ✓ | ✓ | | | ✓ | | | ✓ | | | | ✓ | | | ✓ | 00010 |
| | 001 | ✓ | | | ✓ | | ✓ | ✓ | | | ✓ | | | ✓ | | | | ✓ | | | ✓ | 00011 |
| | 010 | | ✓ | | | ✓ | ✓ | ✓ | | | ✓ | | | ✓ | | ✓ | | | | | ✓ | 00100 |
| | 011 | ✓ | | | ✓ | ✓ | ✓ | ✓ | | | ✓ | | | ✓ | | ✓ | | | | | ✓ | 00101 |
| | 100 | | ✓ | | | ✓ | | ✓ | | ✓ | ✓ | | | ✓ | | ✓ | | | | | ✓ | 00110 |
| | 101 | ✓ | | | ✓ | | | ✓ | ✓ | ✓ | ✓ | | | ✓ | | ✓ | | | | | ✓ | 00111 |
| | 110 | | ✓ | | | ✓ | ✓ | ✓ | | ✓ | | | | ✓ | | ✓ | | | | ✓ | | 01000 |
| | 111 | ✓ | | | ✓ | | ✓ | ✓ | ✓ | | | | | ✓ | | ✓ | | | | ✓ | | 01001 |
| 0011 | 000 | | ✓ | | ✓ | | | ✓ | ✓ | | | ✓ | | | ✓ | | | ✓ | | | ✓ | 00011 |
| | 001 | ✓ | | ✓ | | | | ✓ | ✓ | | | ✓ | | | ✓ | | | ✓ | | | ✓ | 00100 |
| | 010 | | ✓ | | ✓ | | ✓ | ✓ | | | | ✓ | | | ✓ | | | ✓ | | | ✓ | 00101 |
| | 011 | ✓ | | ✓ | | | ✓ | | | | | ✓ | ✓ | | ✓ | | | ✓ | | | ✓ | 00110 |
| | 100 | | ✓ | | ✓ | | | ✓ | ✓ | | ✓ | | | | ✓ | | | ✓ | | | ✓ | 00111 |
| | 101 | ✓ | | ✓ | | | | ✓ ✓ | | | ✓ | | | | ✓ | ✓ | | | | ✓ | | 01000 |
| | 110 | | ✓ | | ✓ | | ✓ | ✓ | ✓ | | ✓ | | | | ✓ | ✓ | | | | ✓ | | 01001 |
| | 111 | ✓ | | ✓ | | | ✓ | | | | | ✓ ✓ | | | ✓ | ✓ | | | | ✓ | | 01010 |
| 0100 | 000 | | ✓ | | | ✓ | | ✓ | | ✓ | | ✓ | | | | ✓ | | | | | ✓ | 00100 |
| | 001 | ✓ | | | ✓ | | | ✓ | | ✓ | | ✓ | | | | ✓ | | | | | ✓ | 00101 |
| | 010 | | ✓ | | | ✓ | ✓ | | | ✓ | | ✓ | | | | ✓ | | | | | ✓ | 00110 |
| | 011 | ✓ | | | ✓ | | ✓ | | | ✓ | | ✓ | | | | ✓ | | | | | ✓ | 00111 |
| | 100 | | ✓ | | | ✓ | | ✓ | | ✓ | ✓ | | | ✓ | | ✓ | | | | | ✓ | 01000 |
| | 101 | ✓ | | | ✓ | | | ✓ | | ✓ | ✓ | | | ✓ | | ✓ | | | | | ✓ | 01001 |
| | 110 | | ✓ | | | ✓ | ✓ | | | ✓ | | ✓ | | ✓ | | ✓ | | | | | ✓ | 01010 |
| | 111 | ✓ | | | ✓ | | ✓ | | | ✓ | | ✓ | | ✓ | | ✓ | | | | | ✓ | 01011 |

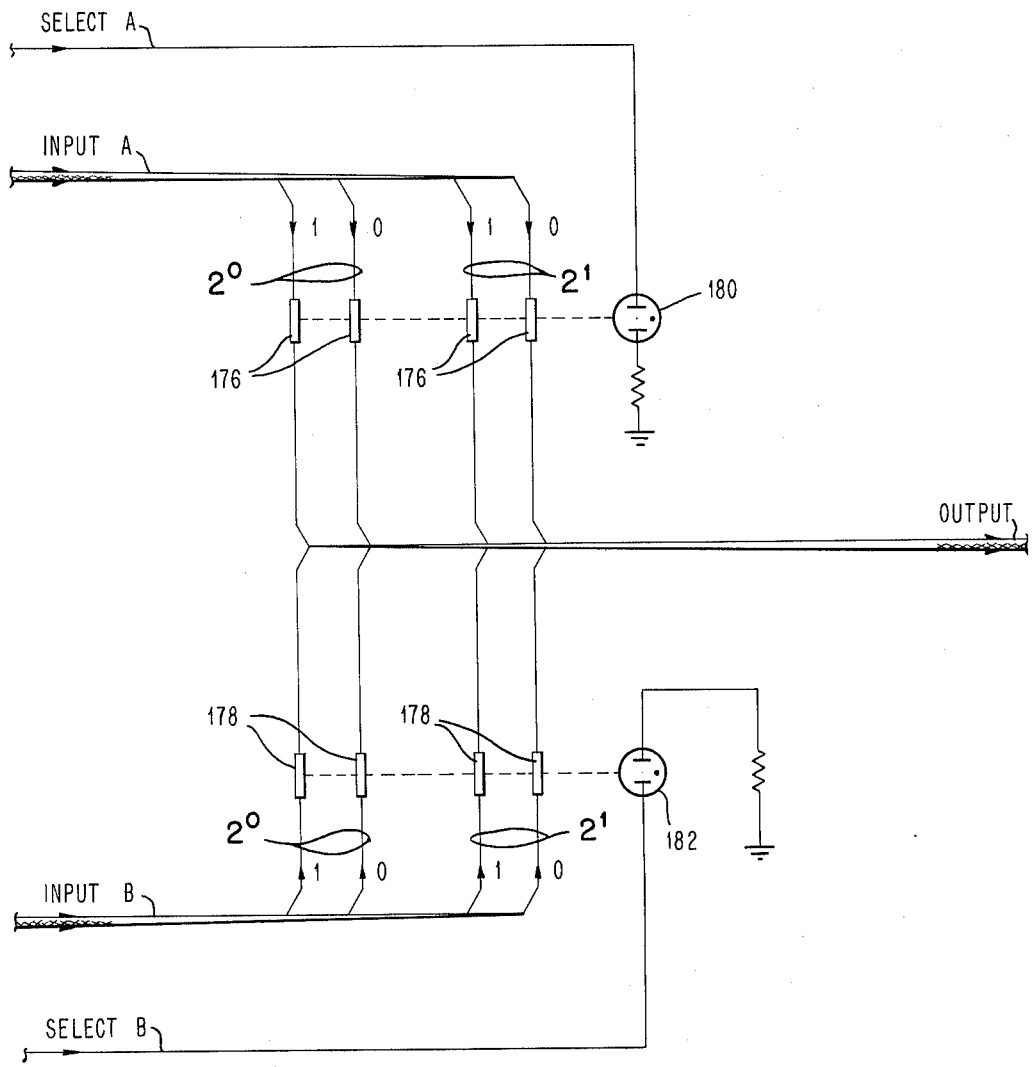

United States Patent Office 3,257,548
Patented June 21, 1966

3,257,548
DIVISION TECHNIQUES
Harold Fleisher, Poughkeepsie, and Robert I. Roth, Briarcliff Manor, N.Y., assignors to International Business Machines Corporation, New York, N.Y., a corporation of New York
Filed Dec. 13, 1961, Ser. No. 159,175
9 Claims. (Cl. 235—164)

This invention relates to computing techniques and, in particular, to a computer for performing division.

Many computers for performing division utilize shift registers and other circuits requiring synchronization. These computers inherently require control circuits and are beset with complex timing problems. The present invention involves computing techniques for performing division that avoid these and other difficulties that are inherent in many previously used devices by using completely unsynchronized apparatus. In addition, a continuous quotient is provided which is promptly corrected when the computer input data is changed.

An object of the present invention is to provide systems for performing division that do not require synchronization.

A further object is to show an unsynchronized, digital computer for performing division using cryogenic elements.

Another object is to show an unsynchronized, digital computer for performing division using neon-photoconductor elements.

The foregoing and other objects, features and advantages of the invention will be apparent from the following more particular description of preferred embodiments of the invention, as illustrated in the accompanying drawings.

Among the available techniques for performing division is the well-known iterative method that is used in paper and pencil calculations and generally termed "long division." Using this procedure in the decimal system, one first subtracts the largest multiple of the divisor that does not provide a negative remainder from the higher-order digits of the dividend, places the next digit of the dividend to the right of the remainder; and then repeats this procedure until all of the digits of the dividend have been exhausted or until the desired degree of accuracy is obtained. The multiples selected are indicative of the quotient. This procedure may be used for performing division in any radix and the following example illustrates the procedure in the binary radix for a dividend of 1011010 and a divisor of 1010:

```
              1001=quotient
       1010  1011010=dividend
             1010
             ────
               10
               00
             ───
              101
              000
             ────
             1010
             1010
             ────
```

In the binary system, this procedure simply involves iterative subtraction of either the divisor itself or "0" because the only numbers that are available as multiples are "1" and "0." In the present invention, this procedure is modified to replace the subtraction operations with addition and an example of this modified procedure for the data used in the previous example follows:

```
                  1001=quotient
Step 1:    1010  0100101=complemented dividend
Step 2:          1010
                 ─────
Step 3:          11101
Step 4:          0000
                 ─────
Step 5:          111010
Step 6:          0000
                 ──────
Step 7:          1110101
Step 8:          1010
                 ───────
                 1111111
```

Step 1: Generate the complement of the dividend by replacing each "1" with a "0" and each "0" with a "1."

Step 2: Add, to the first complemented dividend digits, the largest multiple of the divisor which does not generate a "1" carry (either the divisor itself for the multiple "1" or zero for the multiple "0"). This number represents the highest-order digit of the uncomplemented quotient.

Step 3: Place the next complemented radicand digit to the right of the sum generated in step two.

Step 4: Repeat step two. In this case, the multiple "0" is selected as the quotient digit because a "1" carry would be generated if the divisor were added.

Step 5: Repeat step three.

Step 6: Repeat step two (selecting another "0" multiple).

Step 7: Repeat step three.

Step 8: Repeat step two. In this case, the multiple "1" is selected because the divisor may be added without generating a "1" carry. Thus, the last digit of the quotient is "1."

The procedure outlined above may be described in another way that lends itself to computing apparatus. Each even-numbered step may be considered to include a tentative addition of the divisor to the quantity generated in each preceding (odd-numbered) step and the carry interrogated. When the carry is "0," a quotient digit of "1" is indicated and the sum of tentative addition is used in the succeeding step. When the carry is "1" a quotient of "0" is indicated and the sum of the tentative addition is discarded and the previously-generated quantity is carried through for the succeeding step.

The procedure outlined in the last paragraph is readily adaptable to unsynchronized computer circuitry and forms the basis of operation of the computers embodying the invention as shown in the accompanying drawings.

In the drawings:

FIGURE 1 is an organizational diagram illustrating the interconnection of FIGURES 1a and 1b.

FIGURES 1a and 1b comprise a block diagram of the computer for performing division.

FIGURE 3 is an organizational diagram illustrating the interconnection of FIGURES 3a–3f.

Figure 2:
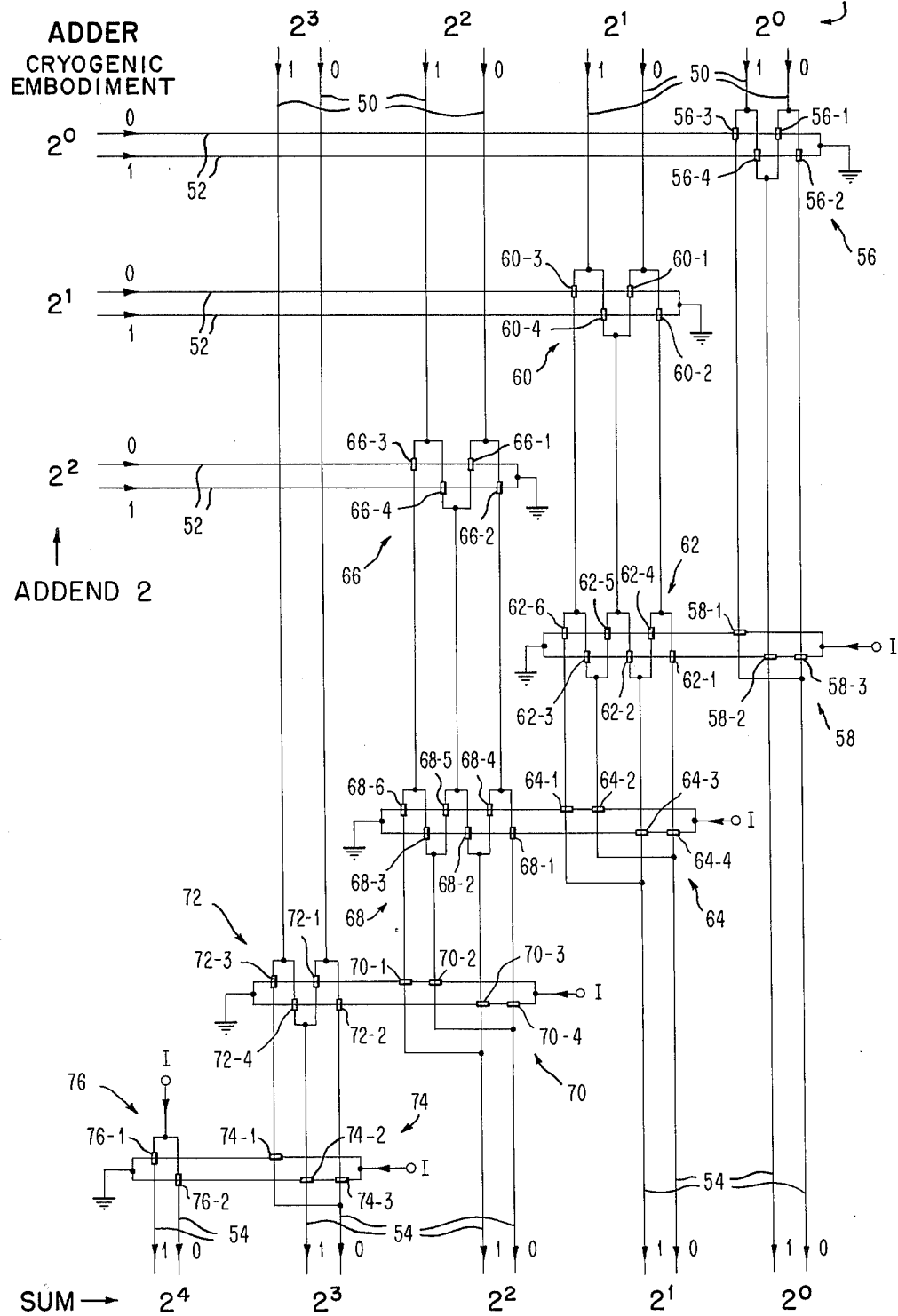
FIGURE 2 is a detailed diagram of an adder circuit suitable for use in a cryogenic embodiment of the invention shown in FIGURE 1.
Figure 3C:
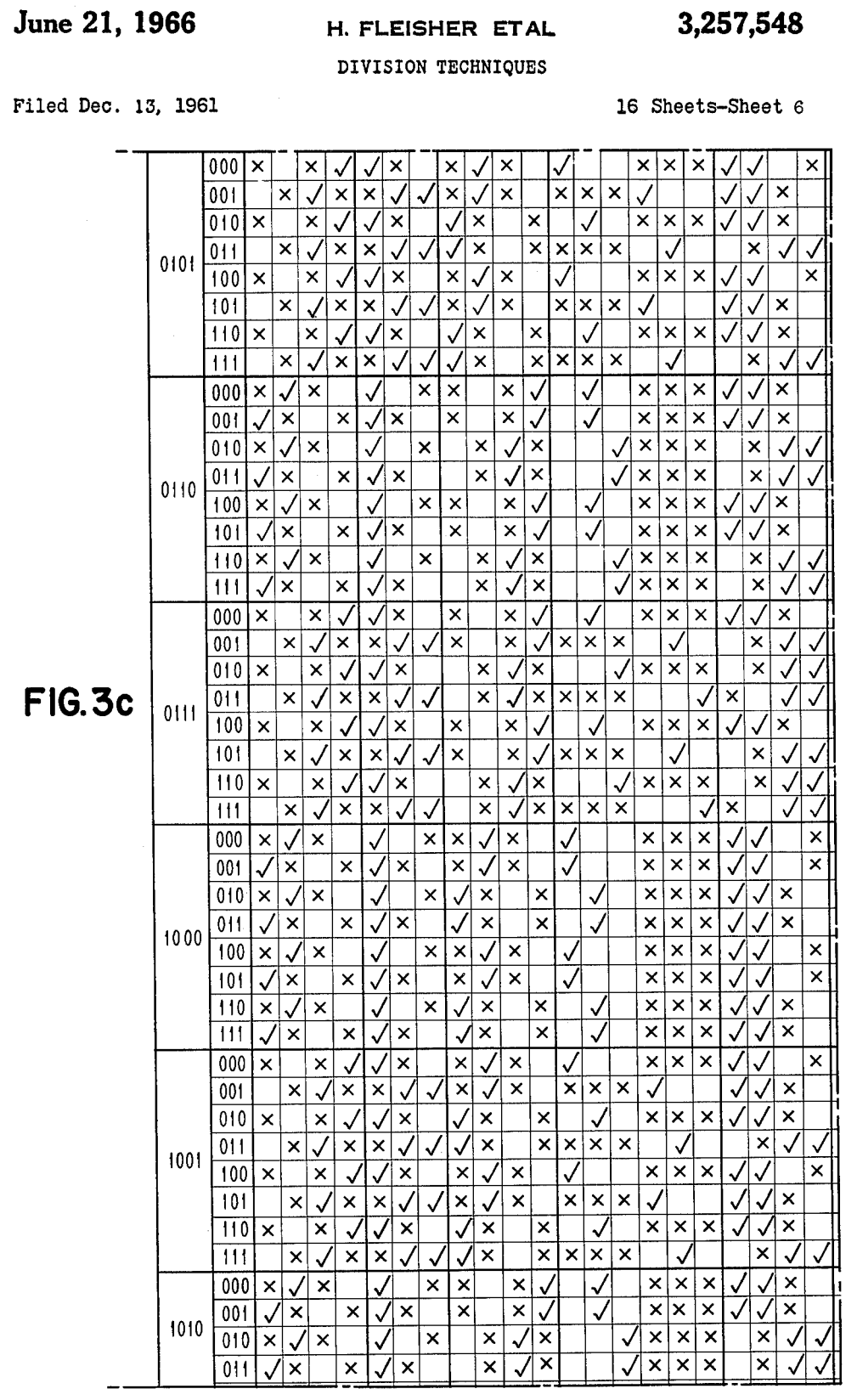
Figure 3D:
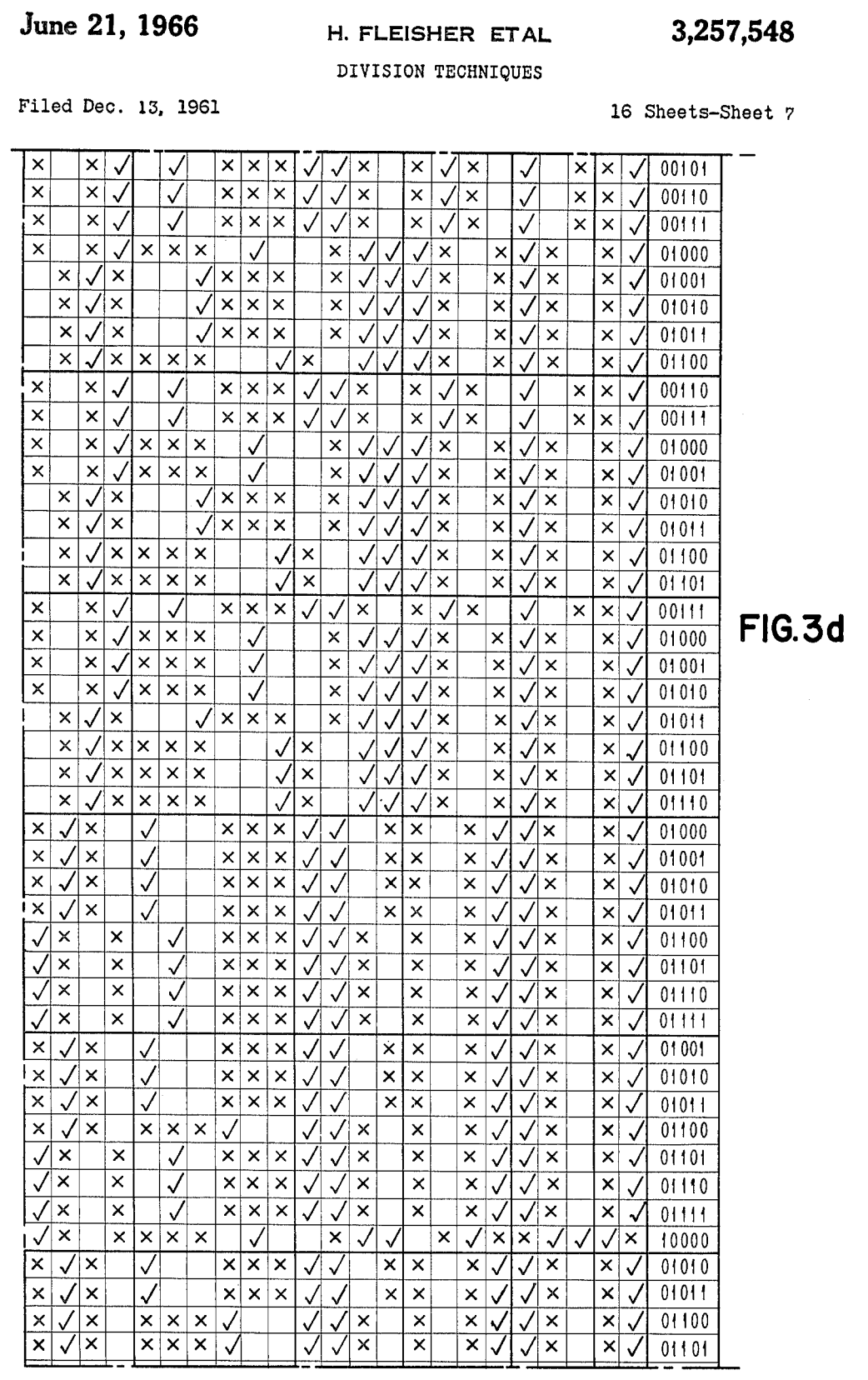
Figure 3E:
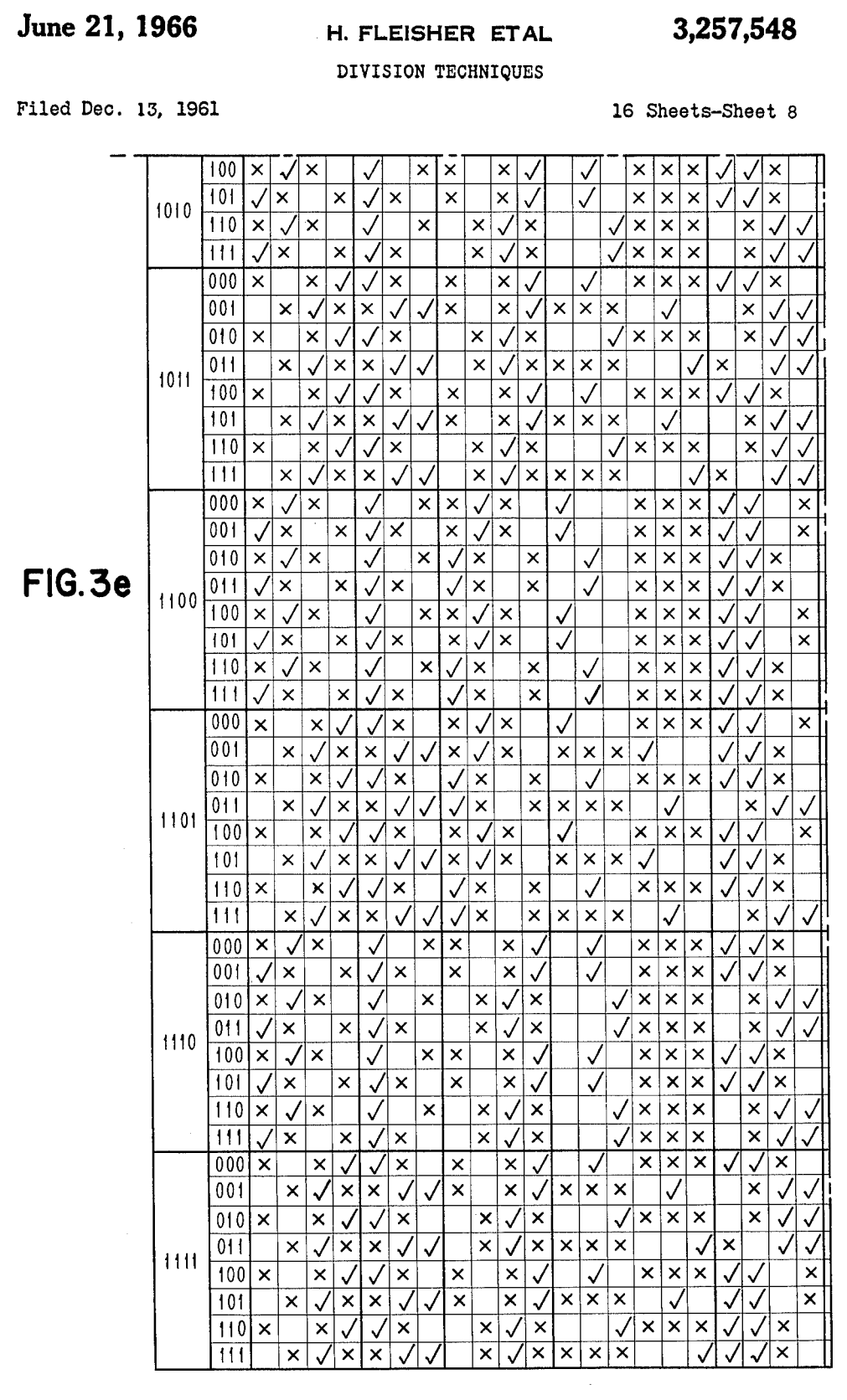
Figure 3F:
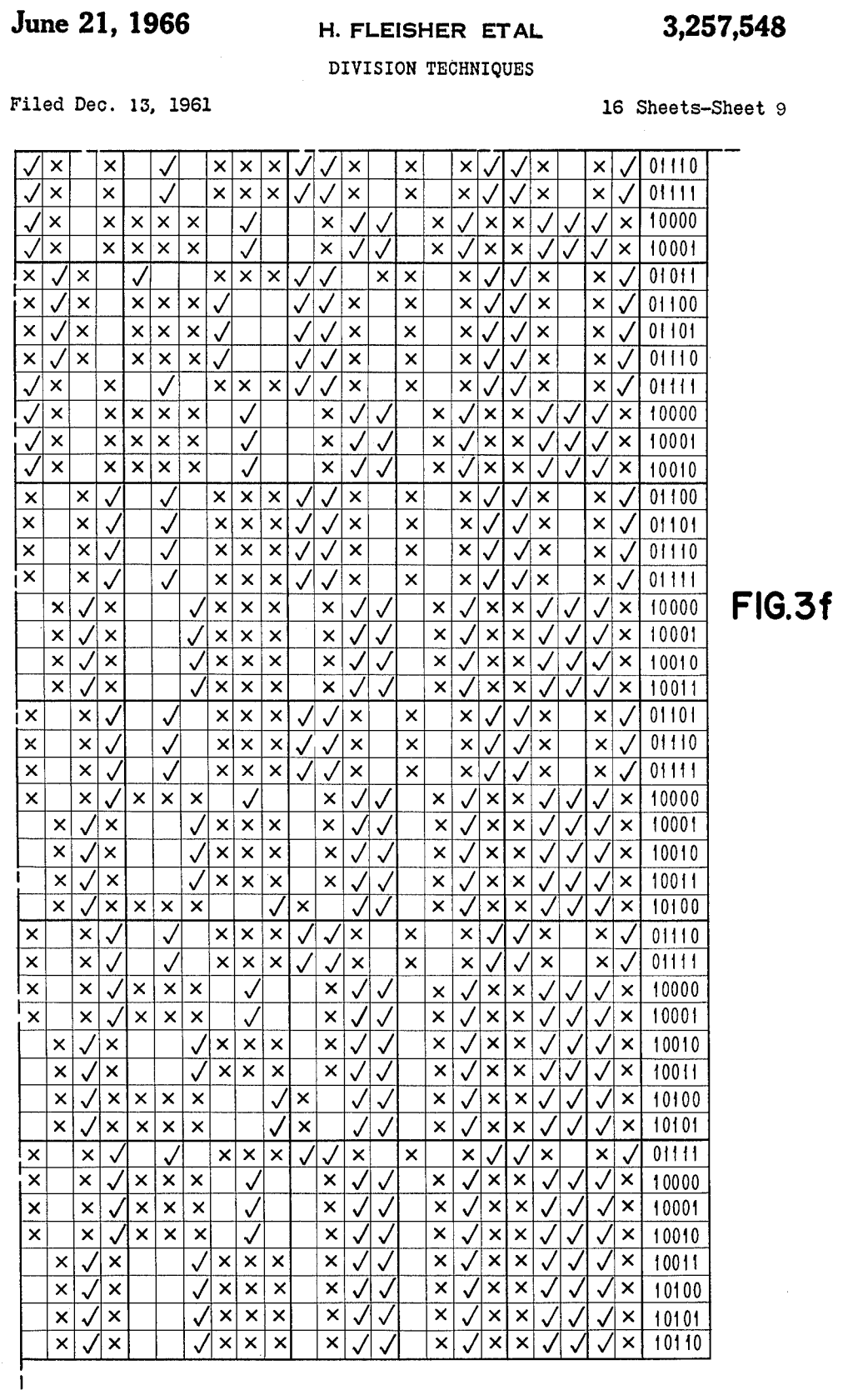

FIGURES 3a–3f comprise a chart indicating the status of the cryogenic elements in the adder shown in FIGURE 2 for all possible addend inputs.

Figure 4:
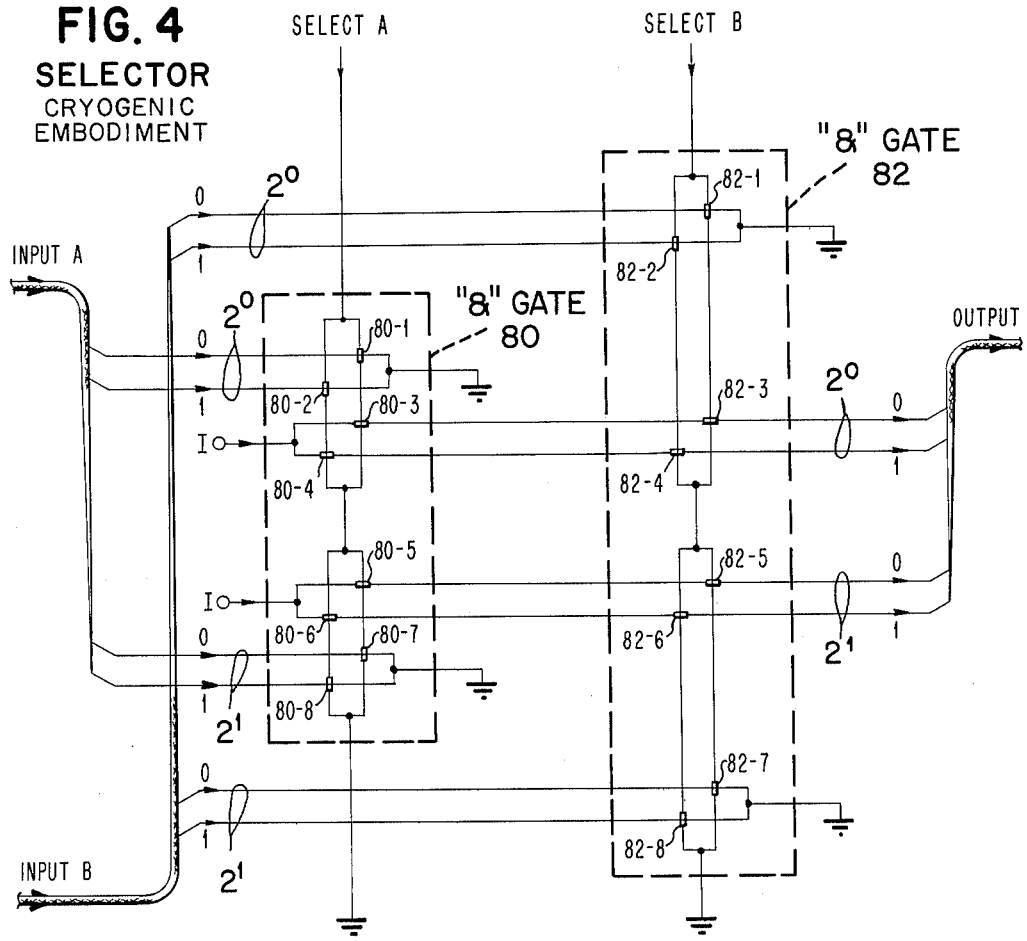

FIGURE 4 is a detailed diagram of a selector circuit suitable for use in a cryogenic embodiment of the invention in FIGURE 1.

Figure 5:
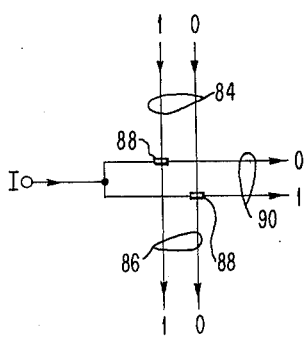

FIGURE 5 is a detailed diagram of a distributor circuit suitable for use in a cryogenic embodiment of the invention shown in FIGURE 1.

Figure 6B:
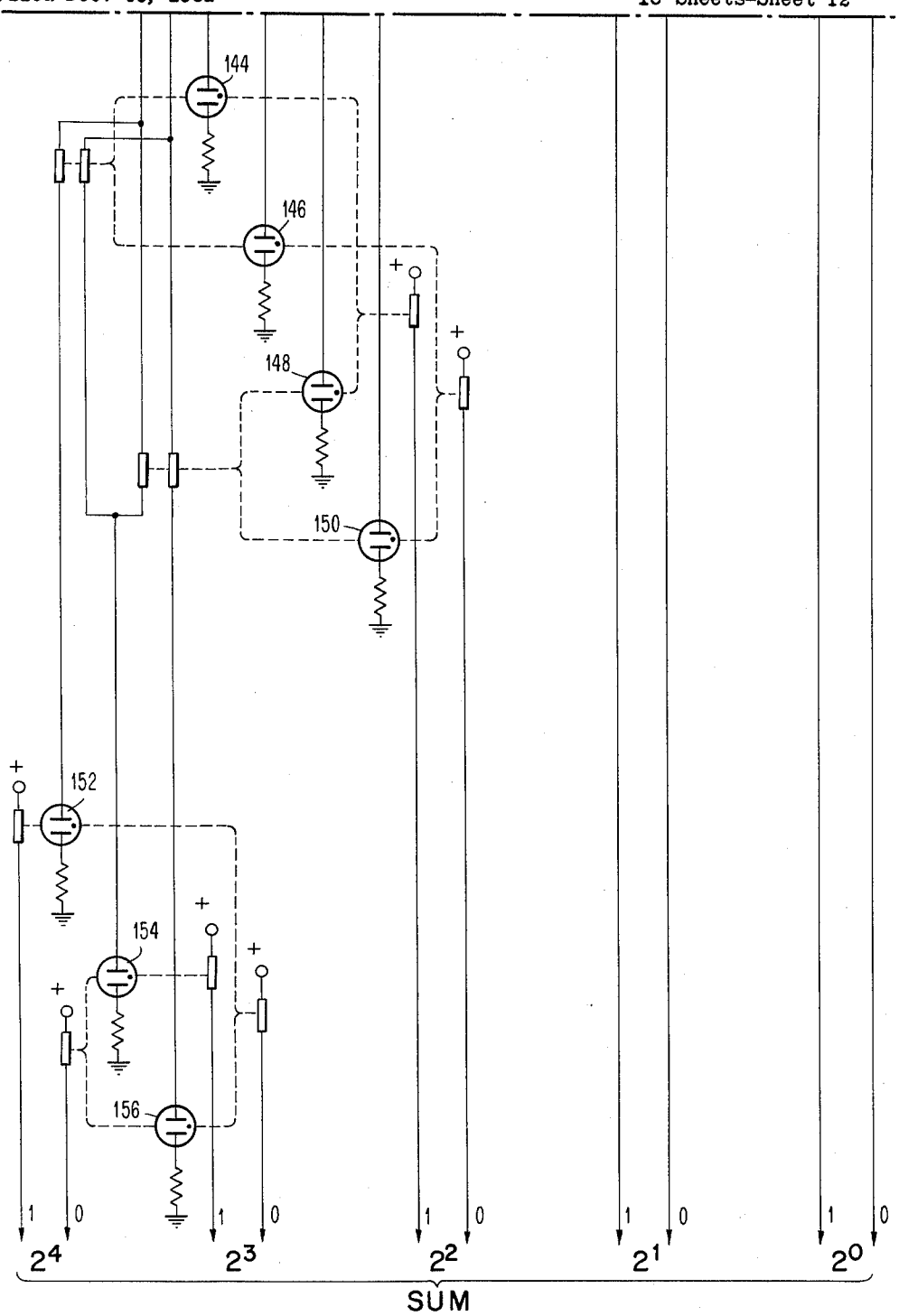

FIGURE 6 is an organizational diagram illustrating the interconnection of FIGURES 6a and 6b.

FIGURES 6a–6b comprise a detailed diagram of an adder circuit suitable for use in a neon-photoconductor embodiment of the invention shown in FIGURE 1.

Figure 7B:
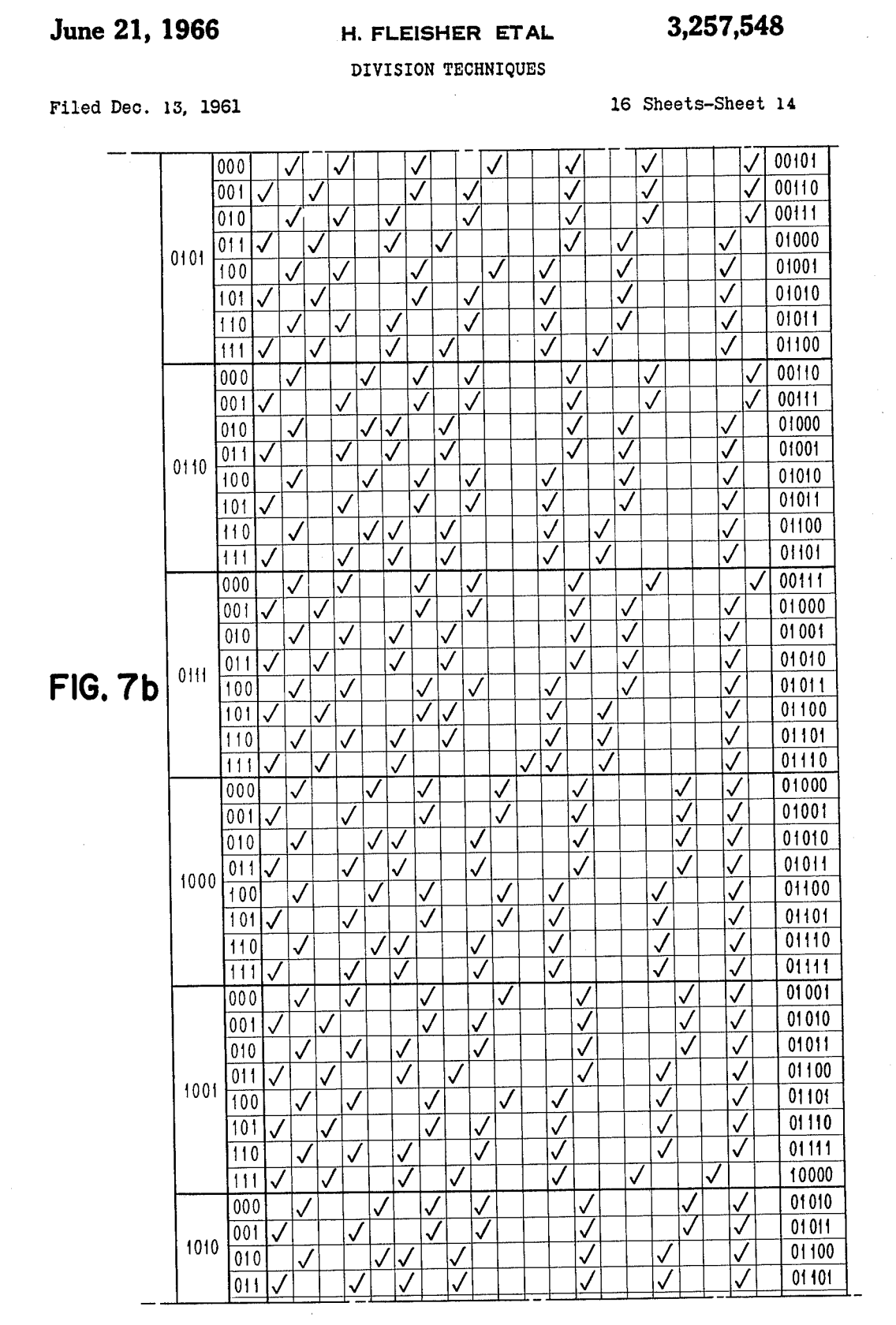
Figure 7C:
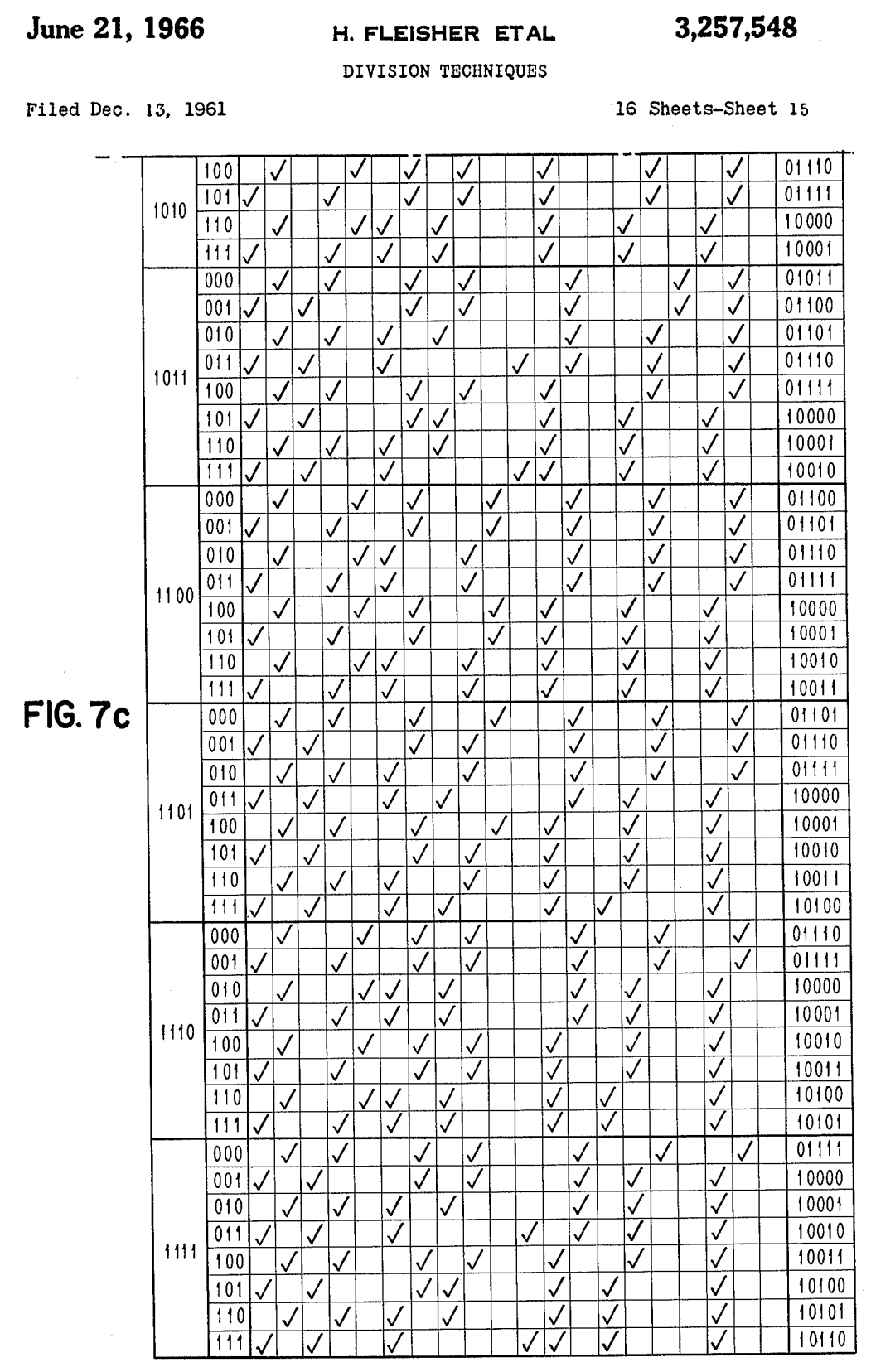

FIGURE 7 is an organizational diagram illustrating the interconnection of FIGURES 7a–7c.

FIGURES 7a–7c comprise a chart indicating the status of the neon lamps in the adder shown in FIGURE 6 for all possible addends.

FIGURE 8 is a detailed diagram of a selector circuit suitable for use in a neon-photoconductor embodiment of the invention shown in FIGURE 1.

Many of the numbers in the block diagram in FIGURE 1 are encircled. These circles may be ignored during the following general description as they relate to an illustrative example which follows the general description.

A seven-bit (digit) dividend is applied to the input of the divider shown in FIGURE 1 on leads 20. Each pair of leads corresponds to one bit of data. The pairs of leads are also labelled to indicate the dividend bit order ($2^0$ through $2^6$).

The lowest-order ($2^0$) bit of the dividend is applied as part of a first input (addend 1) to an adder 22. The next-higher order bit of dividend input is similarly applied to another adder 24, and the successively higher-order bits of the dividend are applied to adders 26 and 28. The highest-order adders has four dividend bits applied because the divisor contains four bits. The dividend is automatically complemented as applied to the adders by applying each "1" lead as the "0" data and each "0" lead as the "1" data of the corresponding adder position or order. The entire divisor is applied as a second input to each adder. Each adder generates a tentative sum (including a carry bit as the highest-order bit of the sum). As described above with respect to the last sample calculation, each bit of the quotient is selected as the largest number which can be multiplied by the divisor to provide a product which generates no carry signal in the subsequent addition. Thus, a "1" carry indicates that the tentatively selected bit ("1") is too large and that a "0" should have been selected. Therefore, each bit of the quotient is merely the complement of the carry signal generated in the appropriate adder. This complementing operation is accomplished by properly labelling the quotient output leads. Since a "0" carry indicates that the corresponding bit of the quotient is a "1" and that the result of the tentative addition should be used, this "0" signal is applied to condition and "and" gate 34 which passes the sum to the subsequent (lower-order) adder where it forms the higher-order bits of the addend 1 input. The lowest-orders bits of this adder input is the subsequent (lower-order) complemented dividend bit, as described above. Similarly, a "1" carry indicates that the corresponding bit of the square root is a "0" and that the result of the tentative addition should not be used. In this case, the "1" carry signal is applied to condition and "and" gate 36 which passes the first adder input (addend 1) rather than the sum of the subsequent (lower-order) adder.

In FIGURE 1, each pair of "and" gates 34, 36 is considered to form a selector 38 and the distribution network for each carry signal is considered to form a distributor 40. This combination of "and" gates and networks into selectors and distributors has been done merely to facilitate the detailed discussion of these circuits.

The following description of the step-by-step operation of the system shown in FIGURE 1 for the dividend 1011010 and division 1010 (also used in the introductory examples) is included to provide a better understanding of the invention.

The sample input dividend 1011010 on leads 20 is shown in FIGURE 1 by the encircled "0" and "1" lead designations. This number is complemented by the connections to the adder as indicated by the encircled addend data. The divisor 1010 is applied as addend 2 to each adder without complementing as indicated by the encircled notations, adder 28 generates a sum of 1110 with a carry of "0." The "0" carry indicates that the highest-order bit of the quotient is a "1." The "0" carry is also applied to condition an "and" gate 34 which supplies the sum 1110 from adder 28 to the higher bit positions of the first input (addend 1) of the subsequent adder 26. The lowest-order bit of this input representing the complement of the appropriate dividend bits. Adder 26 generates a sum 00111 with a carry as indicated by the encircled notations. The "1" carry indicates that the second-highest order bit of the quotient is a "0." Since a "1" carry is generated by adder 26, the sum is not used and addend 1 is supplied as the higher-order bits of the first input to adder 24 through "and" gate 36, and the appropriate complemented dividend bit is used as the lower-order entry. Similarly, adder 24 generates a sum of "1000100" with a "1" carry indicating that the corresponding dividend bit is a "1" and that the generated sum is not to be applied to the subsequent adder. In this case, the "1" carry conditions "and" gate 36 which passes the addend 1 input of adder 24 to the higher-order positions of the first input of the lowest-order adder 22. This adder generates a sum of "1111111" and a "0" carry indicating that the final (lowest-order) bit of the quotient is "1" and that the quotient has been exactly determined.

The divider shown in block diagram of FIGURE 1 has been shown to generate a quotient according to the technique shown in the introductory example. This computer requires no synchronization and fluctuations in the input radicand are continuously reflected in the generated square root.

The adders, selectors and distributors shown in FIGURE 1 will now be described in detail with respect to a cryogenic embodiment and a neon-photoconductor embodiment.

A typical cryogenic adder of the type that may be used in the invention is shown in FIGURE 2. This adder accepts a four-bit addend, labelled "addend 1," applied on leads 50, and a three-bit addend, labelled "addend 2," applied on leads 52, and generates a five-bit sum on leads 54, where the highest-order bit of the sum is considered to be carry bit referred to the description with respect to the block diagram of FIGURE 1. This adder can obviously be modified to provide any desired bit capacity.

The adder shown in FIGURE 2 utilizes cryogenic elements which are called cryotrons. The cryotrons used in the present invention are devices having two current paths: an input or "control" path and an output or "gate" path. In operation, a current flows in the gate (output) path when no current is applied to the control (input) path. Thus, a cryotron may be considered as a logical "inhibitor" element. In FIGURE 2, each cryotron is shown by a rectangle with the gate current flowing in the leads connected to its ends and the control current flowing in the leads connected to its sides.

The lowest-order ($2^0$) addend input bits are applied to a group 56 of four cryotrons. The "addend 2" bit supplies the control current to the cryotrons and, in conjunction with the "addend 1" bit, determines the $2^0$ sum.

When the $2^0$ "addend 1" bit is "0," current flows in the path toward cryotrons 56–1 and 56–2 and the $2^0$ "addend 2" bit provides the control current to determine which of these two cryotrons has a gate current. When the $2^0$ addend 2 bit is 0, cryotron 56–1 is inhibited and current flows through cryotron 56–2 to provide a "0" as the $2^0$ sum bit. When the $2^0$ "addend 2" bit is "1" (and the $2^0$ "addend 1" bit remains "0"), cryotron 56–2 is inhibited and current flows through cryotron 56–1 to provide a "1" as the $2^0$ sum bit. Similarly, a $2^0$ "addend 1" bit of "1" and a $2^0$ "addend 2" bit of "0" generates a "1" as the $2^0$ sum bit by current flowing through cryotron 56–4. When both $2^0$ addend bits are "1," cryotron 56–3 passes current to provide a $2^0$ sum bit of "0." The current flowing from the group 56 of cryotrons is also used to control another group 58 of cryotrons which provide a carry signal when both $2^0$ addend bits are "1," as will be described below.

The $2^1$ addend bits are similarly applied to a group 60 of cryotrons whose operation is similar to the operation of group 56, but the output current from this group is similar to the operation of group 56, but the output current from this group is further controlled by a group 62 of cryotrons before the $2^1$ sum bit is determined. This group 62, in conjunction with group 58, modify the $2^1$ sum bit to account for a $2^0$ carry bit of "1" when both $2^0$ addend bits are "1." In this case, cryotron 58–1 is inhibited and current flows through cryotrons 58–2 and 58–3 to inhibit cryotrons 62–1, 62–2 and 62–3, and uninhibited cryotrons 62–4, 62–5 and 62–6 have the effect of inverting the otherwise present $2^1$ sum output. When a $2^0$ carry of "0" is indicated (by gate current flow through cryotron 58–1), cryotrons 62–4, 62–5 and 62–6 are inhibited and uninhibited cryotrons 62–1, 62–2 and 62–3 pass the output of group 60 without alteration as the $2^1$ sum bit.

Similarly, groups 64 through 76 of cryotrons control the generation of the higher-order sum bits. The chart in FIGURE 3 indicates the operation of each cryotron in the adder in FIGURE 2 for all possible input addends. An "X" in this chart indicates that the associated cryotron is inhibited by a control current and a "√" indicates that a gate current is present.

A cryogenic embodiment of a selector circuit is shown in FIGURE 4. This circuit is suitable for use in the computer shown in FIGURE 1 in conjunction with the adder shown in FIGURE 2 and the distributor shown in FIGURE 5.

One of the two input (A and B) that are applied to the selector circuit shown in FIGURE 4 is chosen as the circuit output, where the selection is determined by the control signals: "Select A" and "Select B." Each input is shown to include two bits of data but the circuit may obviously be extended to operate on input data having any number of bits.

Input A is applied to a first cryogenic "and" gate 80 and input B is applied to a second cryogenic "and" gate 82. The "Select A" and "Select B" signals (corresponding to the carry output signals from the preceding adders shown in FIGURE 1) are also applied to the corresponding "and" gates 80, 82.

When a "Select A" current is applied to the circuit shown in FIGURE 4, a gate current flows through cryotron 80–1 or 80–2, depending upon the $2^0$ bit of a A input signal. When this bit is "0," cryotron 80–1 is inhibited and gate current flows through cryotron 80–2. Similarly, when the $2^0$ bit of A input signal is "1," gate current flows through cryotron 80–1. The gate current through cryotrons 80–1 and 80–2 is the control current for cryotrons 80–3 and 80–4. Thus, when the $2^0$ bit of A input signal is "0," cryotron 80–4 is inhibited and gate current flows through cryotron 80–3 to provide a "0" as the $2^0$ bit of the output signal. Similarly, when the $2^0$ bit of the A input signal is "1," gate current flows through cryotron 80–4 to provide a "1" output signal. In the same manner, the "Select A" control signal passes the $2^1$ bit of the A input signal as the $2^1$ bit of the output signal by the operation of cryotrons 80–5, 80–6, 80–7 and 80–8.

Cryotrons 82–3, 82–4, 82–7 and 82–8 in "and" gate 82 have no effect on the output of "and" gate 80 when the A input signal is to be selected because there is no current applied to the "Select B" input and, hence, no current available to inhibit any of these cryotrons.

Similarly, cryotrons 82–1 through 82–8 in "and" gate 82 operate to choose the B input signal as the output signal as the output signal when a "Select B" control signal is applied.

A cryogenic embodiment of a distributor circuit is shown in FIGURE 5. This circuit is suitable for use in the computer shown in FIGURE 1 in conjunction with the adder shown in FIGURE 2 and the selector shown in FIGURE 4. This circuit is used to provide two separate and identical signals where only one signal is available and is used in a cryogenic system to avoid splitting a current into several paths. In FIGURE 5, the single input signal on leads 84 is applied as a first output signal on leads 86 and as the control signal to cryotrons 88 to provide an additional similar output signal on leads 90.

The detailed cryogenic circuits shown in FIGURES 2, 4 and 5 are typical circuits that may be used in a cryogenic embodiment of the computer shown in FIGURE 1. A second embodiment of this computer using neon-photoconductor elements is based on the block diagram of FIGURE 1 and the detailed diagrams of a typical adder shown in FIGURE 6 and a typical selector shown in FIGURE 8. A detailed diagram of a distributor circuit is not shown because the physical connections shown in the distributor blocks 40 in FIGURE 1 may be used in the neon-photoconductor embodiment.

In the circuit shown in FIGURES 6 and 8, solid lines are used to indicate electrical connections and dashed lines are used to indicate light paths. The photoconductor elements are indicated by rectangles having electrical connections at their ends and light applied at their sides. The photoconductor elements have a high impedance when no light is applied and a low impedance when light is applied. Thus, these elements act as gates, passing current when conditioned by light.

A typical adder shown in FIGURE 6 operates on a four-bit addend (addend 1) and a three-bit addend (addend 2) to generate a five-bit sum, where the highest-order ($2^4$) bit corresponds to the carry signal required in the computer in FIGURE 1. FIGURE 6a should be placed above FIGURE 6b to obtain the composite FIGURE 6. This typical adder can obviously be extended to operate on any number of addend bits.

In FIGURE 6, the $2^0$ addend 2 signal is applied to operate a corresponding neon lamp 102 or 104 which conditions the corresponding pair of photoconductor (PC) elements 103–1, 103–2, or 105–1, 105–2. The $2^0$ addend 1 signal is then passed to light one of three lamps 106, 107 and 108. When both $2^0$ addend bits equal "0," current flows through PC element 105–2 to light lamp 108. Similarly, when both $2^0$ addend bits equal "1," current flows through PC element 103–1 to light lamp 106. When one addend bit is "0," and the other is "1," current flows through PC element 103–2 or 105–1 to light lamp 107. In the first two cases (0+0 or 1+1), light is applied from a neon lamp 108 or 106, respectively to condition a PC element 112, which provides a $2^0$ output sum bit of "0." In the third case (0+1 or 1+0), light from lamp 107 conditions a PC element 114, which provides a $2^0$ output bit of "1."

The $2^1$ addend bits are applied to a similar circuit comprising neon lamps 116 and 118 and PC elements 120–1, 120–2, 122–1 and 122–2, but the output of this circuit is applied to two groups of PC elements 124 and 126. PC elements 124 are conditioned by light from lamp 106 when both $2^0$ addend bits are "1," indicating a $2^0$ carry of "1." For all other combinations of $2^0$ addend bits (0+0, 0+1 or 1+0), a $2^0$ carry of "0" is present and PC elements 126 are conditioned. In the latter case ($2^0$ carry of "0") one of a group of neon lamps 128, 130 and 132 is lighted and a PC element 136 or 138 is conditioned to provide a $2^1$ output sum bit in the manner described for the $2^0$ bit addition. However, when a $2^0$ carry of "1" is indicated, PC elements 124 are operated and have the effect of shifting the position of the lighted lamp. That is, with a $2^0$ carry equal to "1" and with $2^1$ addend bits both equal to "0," lamp 130 is lighted (instead of lamp 132 which is lighted when both $2^1$ bits equal "0" and the $2^0$ carry is "0"). Similarly, with a $2^0$ carry equal to "1" and with one $2^1$ addend bit equal to "1" and the other $2^1$ addend bit equal to "0," lamp 128 (instead of lamp 130, in the "0" carry case), is lighted; and with a $2^0$ carry of "1" and with $2^1$ addend bits that are both "1," lamp 134 instead of lamp 128, in the "0" carry case is lighted. Thus, a $2^1$ output sum of "0" is indicated for a $2^0$ carry of 0 and $2^1$ addend bits that are both "0" or both "1," or for a $2^0$ carry bit of "1" with one $2^1$ addend bit of "1" and one $2^1$ addend bit of "0."

The operation of the adder shown in FIGURE 6 for all possible addends is outlined in the chart in FIGURE 7 where a "√" indicates a lighted neon lamp.

This chart should be referred to in conjunction with the dashed line light paths shown in FIGURE 6 for an indication of the status of the PC elements for any pair of addends.

A selector circuit suitable for use in a neon-photoconductor embodiment of the invention is shown in FIGURE 8.

One of the two inputs (A and B) that are applied to the selector circuit is chosen as the circuit output, where the selection is determined by the control signals: "Select A" and "Select B." Each input is shown to include two bits of data but the circuit may obviously be extended to operate on input data having any number of bits. Each lead corresponding to input A is applied to a PC element 176 and each lead corresponding to input B is applied to a PC element 178. When a "Select A" control signal is present, a neon lamp 180 is lighted, conditioning its associated PC elements 176 which then pass the input A data as the circuit output. Similarly, when a "Select B" control signal is applied to light neon lamp 182, PC elements 178 are conditioned and the input B data is passed as the circuit output.

Two embodiments of a divider have been shown and described in detail. These embodiments are examples of a computing technique that requires no synchronization. This technique makes use of a group of devices for linearly combining a plurality of signals (such as a group of adders) where a portion of the computer input data is applied as one input to each device and where a second input to each device is responsive to the output of the device which has the next higher-order input data applied. This technique provides an output quotient which has the added advantage of being continuously responsive to the computer input whether it be constant or changing.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer for performing division comprising, in combination:
   a plurality of $m$ unsynchronized linear combination circuits, each corresponding to an order of the $m$th-order quotient and each for generating a first and a second output, where each output is indicative of a function of a linear combination of a plurality of applied multiple-order digit representations and where the first output is also indicative of a function of the corresponding digit of the quotient;
   means for establishing, as a first plurality of multiple-order digit representations in the $m$th-order circuit, a plurality of dividend digits, where the highest-order dividend digit is established as the highest-order digit representation, and successively lower-order dividend digits are established as the successively lower-order representations;
   means for establishing, as the lowest-order digit representation of a first of the plurality of multiple-order digit representations in the successively lower-order circuits, the successively lower-order digits of the dividend;
   means for establishing the divisor as a second of the plurality of multiple-order digit representations in each circuit;
   selector means responsive to the first output of the next-higher order circuit for establishing, as the remaining digits of the first of the plurality of multiple-order digit representations in each circuit except for the circuit corresponding to the $m$th-order digit of the quotient, the digits established in the first of the plurality of multiple-order digit representations in the next higher-order circuit when said first output of the next higher-order circuit assumes a first value and said second output of the next higher-order circuit when said first output of the next higher-order circuit assumes a second value, and where each digit thus established is established in the order that is one greater than its corresponding order in said next higher-order circuit.

2. The apparatus as described in claim 1, where the circuits and selector means are comprised of cryogenic elements.

3. The apparatus as described in claim 1 where the circuits and selector means are comprised of neon-photoconductor elements.

4. A computer for performing division in the binary system comprising, in combination:
   a plurality of $m$ unsynchronized binary adder circuits, each corresponding to an order of the quotient, each for operating on two multiple-bit addends, and each for generating an ouput comprising a carry representation and a multiple-bit sum representation;
   means for establishing, as the first addend in the $m$th-order adder circuit, the complement of a plurality of dividend digits, where the complement of the highest-order digit of the first addend and the complements of successively lower-order dividend digits are established as the successively lower-order digits of the first addend;
   means for establishing, as the lowest-order bit of the first addend in the successively lower-order adder circuits, the complement of the successively corresponding lower-order bits of the dividend;
   means for establishing the divisor as the second addend in each circuit;
   a plurality of selector circuits, each responsive to the carry output of the next higher-order adder circuit and each for establishing, as the remaining bits of the first addend in each adder circuit except for the adder circuit corresponding to the $m$th-order digit of the quotient, the first addend of the next higher-order adder when the carry representation of the next higher-order adder circuit assumes a first value and the sum representation of the next higher-order adder circuit when the carry representation of the next higher-order circuit assumes a second value, and where each bit thus established is established in the order that is one greater than its corresponding order in the next higher-order circuit;
   whereby the bits of the quotient are indicated by the complements of the carry representations of the corresponding adder circuits.

5. The apparatus as described in claim 4, where the adder circuits and selector circuits are comprised of cryogenic elements.

6. The apparatus as described in claim 4, where the adder circuits and selector circuits are comprised of neon-photoconductor elements.

7. A computer for performing division comprising, in combination:

a plurality of $m$ unsynchronized linear combination circuits, each corresponding to an order of the $m$th-order quotient and each for generating a first and a second output, where each output is indicative of a function of a linear combination of two applied multiple-order digit representations and where the first output is also indicative of a function of the corresponding digit of the quotient;

means for establishing, as a first of the two multiple-order digit representations in the $m$th-order circuit, a plurality of dividend digits, where the highest-order dividend digit is established as the highest-order digit representation, and successively lower-order dividend digits are established as the successively lower-order digit representations;

means for establishing, as the lowest-order digit representation of a first of the two multiple-order digit representations in the successively lower-order circuits, the successively lower-order digits of the dividend;

means for establishing the divisor as a second of the two multiple-order digit representations in each circuit;

selector means responsive to the first output of the next higher-order circuit for establishing, as the remaining digits of the first of the two multiple-order digit representations in each circuit except for the circuit corresponding to the $m$th-order digit of the quotient, the digits established in the first of the two multiple-order digit representations in the next higher-order circuit when said first output of the next higher-order circuit assumes a first value and said second output of the next higher-order circuit when said first output of the next higher-order circuit assumes a second value, and where each digit thus established is established in the order that is one greater than its corresponding order in said next higher-order circuit.

8. The apparatus as described in claim 7, where the circuits and selector means are comprised of cryogenic elements.

9. The apparatus as described in claim 7, where the circuits and selector means are comprised of neon-photoconductor elements.

References Cited by the Examiner

UNITED STATES PATENTS

| | | | |
|---|---|---|---|
| 2,924,383 | 2/1960 | Weiss | 235—159 |
| 2,932,450 | 4/1960 | Knight et al. | 235—159 |
| 2,936,380 | 5/1960 | Anderson | 235—176 X |
| 3,004,705 | 10/1961 | Bremer | 235—164 |
| 3,141,964 | 7/1964 | Fleisher | 235—175 |

ROBERT C. BAILEY, *Primary Examiner.*

DARYL W. COOK, *Examiner.*